Sept. 28, 1943.  G. A. RUBISSOW  2,330,385
ACCELERATOR PEDAL DEVICE
Filed Aug. 30, 1940  3 Sheets-Sheet 1
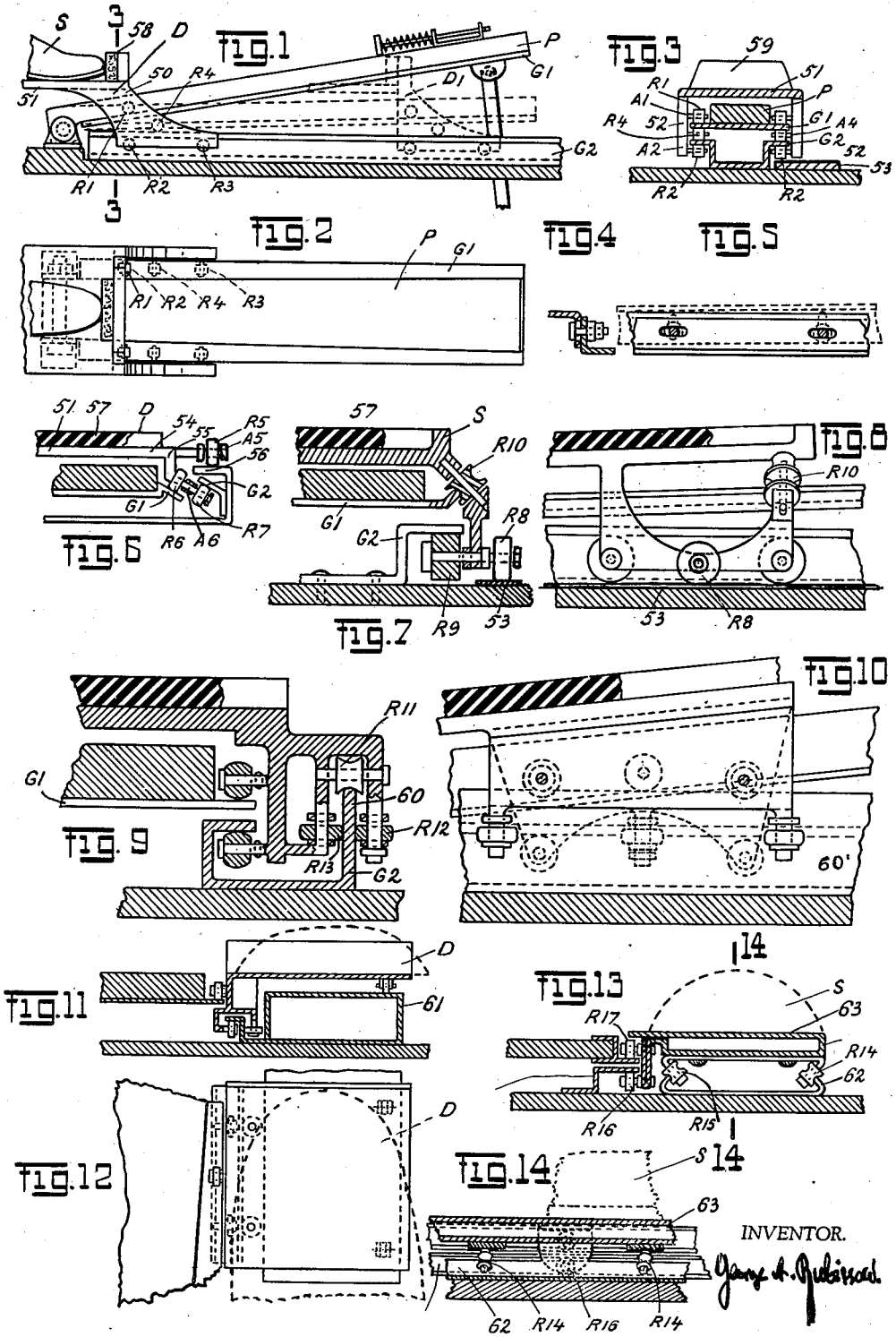
INVENTOR.

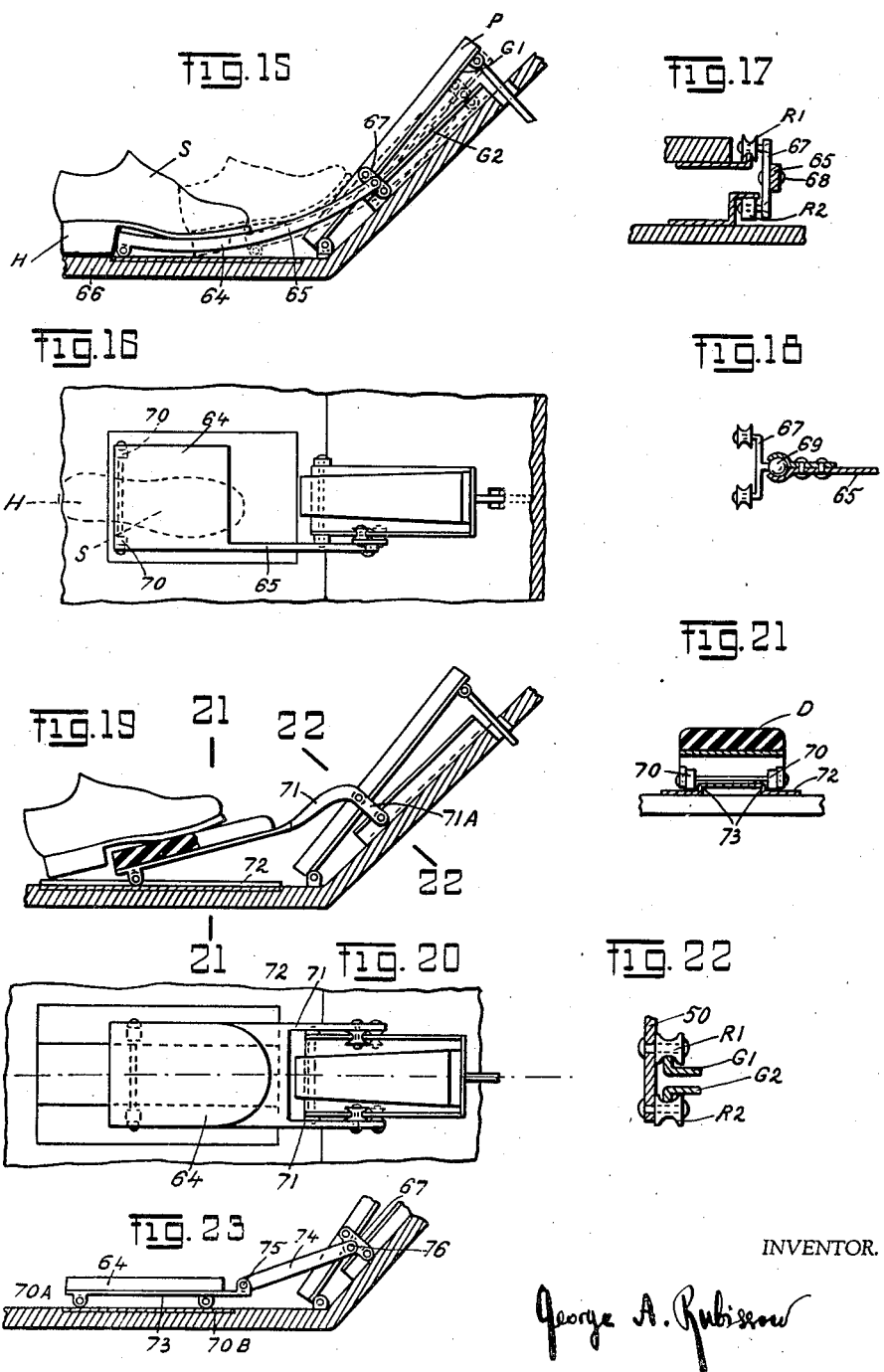

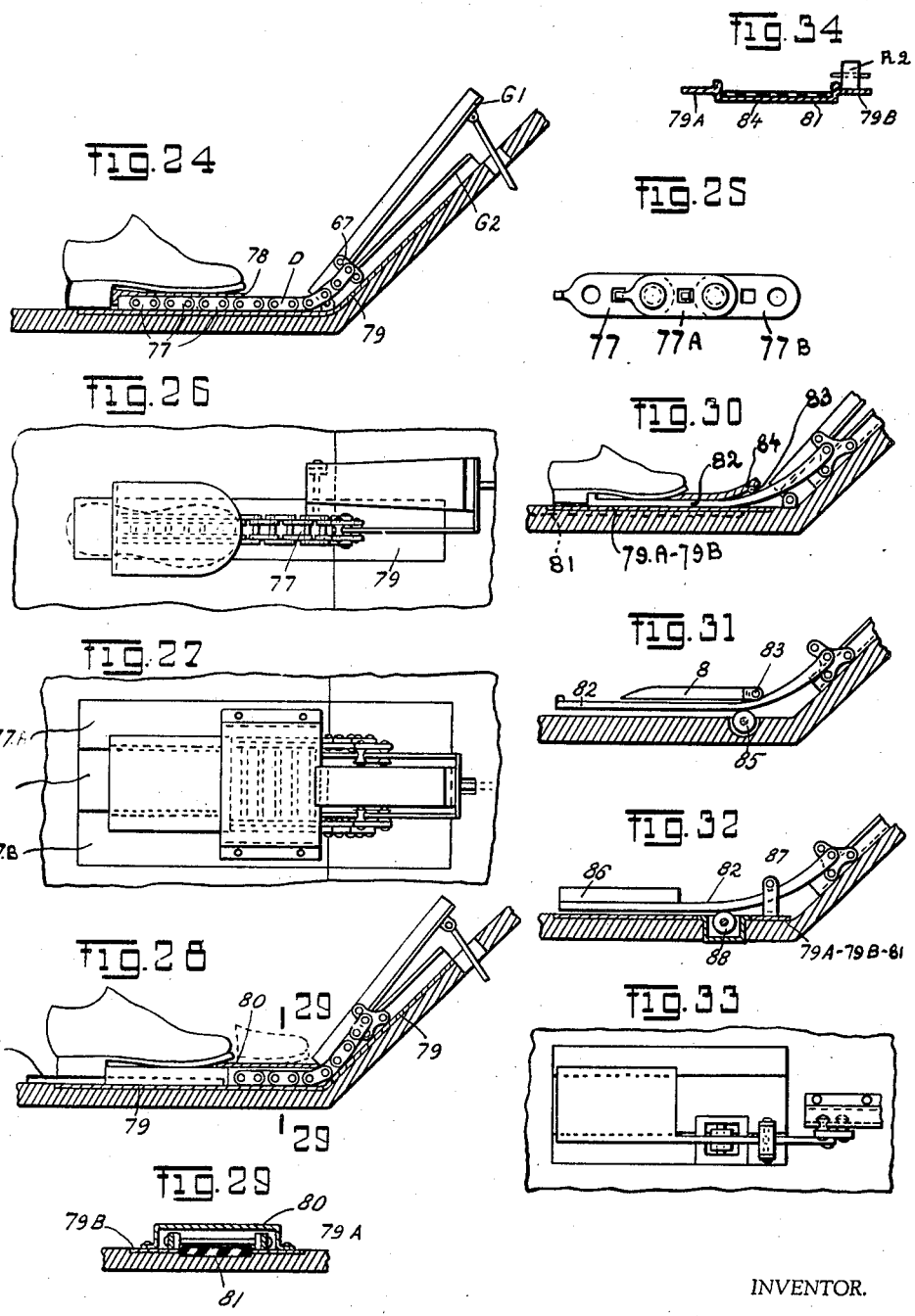

Patented Sept. 28, 1943

2,330,385

UNITED STATES PATENT OFFICE 2,330,385

ACCELERATOR PEDAL DEVICE

George A. Rubissow, New York, N. Y.

Application August 30, 1940, Serial No. 354,891

9 Claims. (Cl. 74—513)

Several improvements have been made to provide a device which can be used in combination with the throttle of an automobile and, in particular, in combination with the accelerator pedals, such as are now used in the modern vehicle.

This invention provides a still further improvement which will more fully appear from the following description when the same is read in connection with the accompanying drawings and the appended claims. It is to be expressly understood, however, that the drawings are for purposes of schematical illustration only and are not intended as a definition as to the design or to the limits of the several aspects of this invention.

All figures represent different aspects of this invention in simplified and diagrammatical form of illustration. In the drawings wherein like reference characters refer to like parts throughout the several views:

Figure 1 is a longitudinal side-view of one embodiment of this device mounted on an accelerator pedal.

Figure 2 is a plan-view of Figure 1.

Figure 3 is a cross-sectional view 3—3 of Figure 1.

Figure 4 is a cross-sectional view of an adjustable guiding-means.

Figure 5 is a longitudinal view of the adjustable guiding-means.

Figures 6, 7, 9, 11, 13, are front views partly in cross-section of different embodiments.

Figures 8, 10, 12, and 14 represent respective side-views with parts broken out of Figures 7, 9, 11 and 13.

Figures 15, 19, 23, 24, 28, 30, 31, 32, represent longitudinal side-views of other embodiments of the device and the accelerator pedal.

Figure 16 is a plan-view of Figure 15.

Figures 17 and 18 are cross-sectional views with parts broken out of a guiding-means.

Figure 20 is a plan-view of Figure 19.

Figure 21 is a cross-sectional view of Figure 19.

Figure 22 is a cross-sectional view of the guiding-means of Figure 19.

Figure 25 is a plan-view of an element of a caterpillar chain connection.

Figure 26 is a plan-view of Figure 24.

Figure 27 is a plan-view of another embodiment.

Figure 29 is a cross-sectional view of Figure 23.

Figure 33 is a plan-view of Figure 32.

Figure 34 is a cross-sectional view of Figure 30.

One embodiment of this invention consists in providing the accelerator pedal P, a guide-means G1 rigidly affixed to the said pedal. The pedal may be of any shape and size. It may be round or in the form as illustrated on Figures 1, 2 and 3.

For the convenience of the description, a strip-like shaped pedal will be depicted in all drawings, but it is not to be construed as limiting this invention to the employment thereof, and various embodiments herein described may be affixed on any shape of pedal, such as, for instance, on a round pedal, ovular, pivoted by a front or rear axle, or a pedal pivoted on an axle below the floor of the car.

The guide-means G1 may be affixed to the pedal P by mechanical means such as screws, balls, clips, or by glue or cement, or G1 may be one piece with the pedal or the pedal itself having a suitable surface which can be considered as serving for or substituting for the said guide-means G1. The shape of the guide-means G1 may be a straight line as shown on Figures 1, 2, 3 and 4.

Another guide-means G2 is mounted rigidly in respect to the floor and has the same horizontal contour as G1. Such an arrangement is one of the most convenient. The two guide-means G1 and G2 are operatively connected, one with the other, by means of a device D, which consists of a frame 50 having a flat member 51 and flanges 52 bent downwards, in which flanges are mounted at least two pivots or axles, on which rollers R1 and R2 are freely rotatable, as illustrated in Figures 1, 2 and 3. The roller R1 contacts the upper side of the guide-means G1 and R2 contacts the under side of guide-means G2. In its normal non-operative position, as shown on Figure 1 by way of example, the two guide-means G1 and G2 slightly touch or press against the said rollers R1 and R2 due to the pedal P being urged upwards by its spring. When moving such a device D from the front end of the pedal upwards into position D1 of Figure 1, the two rollers attempt to compress the edges of the guide-means on which they roll and thereby actuate the pedal. Instead of two rollers, as aforementioned, and as illustrated on Figures 19, 20, 22, three or more rollers may be employed. For instance, roller R3, to operate similarly to roller R2, and roller R4 (placed between roller R1 and R3 or at any other suitable place on an axle A3, rigid in respect to the flanges 52) to press slightly against the upper side of guide-means G2. This makes it possible for the driver's foot or shoe S to press on the support 51 of the device D without pressing at the same time the pedal P downwards. If only two rollers on each flange are used, the pedal P can then be slightly pressed downwards, unless the floor is provided with guide-means 53 on which the roller R2 rolls, or slides, as shown on Figure 3. The guide-means G1 and G2 and the rollers R1 and R2, or R1, R2 and R3, can be mounted if desired, only on one side of the pedal. The guide-means G1 and G2 may also be of a different horizontal contour, however, the longitudinal guiding edges should preferably be parallel one to the other. Guide-means G2 may be adjustable, as illustrated on Figures 4 and 5.

Another embodiment is shown on Figure 6 wherein the support 54 of the device D has a flange 55 extending downwards and provided with an axle A5 on which is mounted roller R5, and with an axle A6 on which two rollers R6 and R7 are mounted. In this particular arrangement, the interconnection of both G2 and G1 is achieved by the two rollers R6 and R7 mounted on the same axis and divided between them by means of a suitable washer. Guide means G1 and G2 have their guiding flanges preferably parallel, as shown on Figure 6. They may, however, also be inclined one to the other, but their edges must be parallel. Guide-means G2 may further be provided with an extending bent flange 56 on which the roller R5 rolls, thus avoiding the involuntary compression of the throttle. Similar devices are also shown on Figures 7, 8, 9, and 10, the operation of which devices is self-explanatory. A layer 53 to facilitate the rolling of the roller R8 may be provided. The support S may be covered by a rubber sponge, or may have a rubber front part 58, Figures 1 and 2. The support 51 may further be provided with extending flange 59.

The rollers may be of any shape—curved, as rollers R6 and R7, straight, as rollers R8 and R9, or have a groove as rollers R10 and R11. Rollers with grooves are particularly advantageous and shown on Figures 17, 18, 22 and 27. The side flanges 51 and 52 may be of any shape or form.

If roller R10 is employed, (Figures 8 and 10), the undesirable displacement of device D to the left or to the right in respect to the longitudinal axis of the throttle, will be prevented.

On Figures 9 and 10 the same result is achieved by providing one or two additional pairs of rollers R12 and R13 and an additional pair of extending flanges 60 rigid in respect to the floor, or made of one piece with guide-means G1 and G2. An arrangement of this kind precludes any undesirable displacement of the device either up or down, or to the right or to the left.

If desired, still another embodiment may be employed as illustrated on Figures 11 and 12, wherein the device D is not mounted on the pedal itself, but is mounted on a casing 61 either left or right of the pedal. The operation of this device is similar to the operation as shown on Figures 9 and 10.

Still another arrangement is shown on Figures 13 and 14 wherein the supporting member 62 has two inclined flanges on which at least one roller R14 and at least one roller R15 are mounted on an axle rigid with supporting member 63 on which shoe S rests and which is bent out from one single piece of metal with rollers R16 and R17 affixed thereon.

Other embodiments of this invention are illustrated on Figures 15 to 33 inclusive. A support 64, Figures 15, 16 and 17, having a curved surface or a flat surface on which the sole of the shoe (or, if desired, both sole and heel) rests, or which can be contacted by the tip of the sole or by the heel, between the heel and the sole, as shown on the figure, preferably in such a manner that heel H rests freely on floor 66 so that the weight of the foot creates a friction between the heel and the floor which friction, in a majority of cases, is more than sufficient to maintain, free of any muscular exertion, support 64 in any operative position in which it is placed. Support 64 may be rigidly affixed or may be pivoted or may form one piece with the operative rod 65 which is interconnected by means of two or more guiding elements, preferably rollers, to guide-means G1 and G2, of the character previously described herein. Rod 65 should preferably be articulated in respect to frame 67 on which rollers R1, R2 or any other combination of rollers is mounted. This articulation may be a pivot 68 or any other form of articulation, in particular, a ball-like articulation 69, as shown on Figure 18. It is preferable that support 64 be provided with at least one roller 70, or a plurality of rollers mounted close to the free end of support 64 or as near as possible to it, whereby when heel H pushes support 64 to and fro, rod 65 operates the throttle by pressing down the pedal P which returns automatically to its original position when the foot is released due to the spring urging the pedal upward, and also to the weight of the device D including the rod and the rollers, especially in view of the fact that the pedal P is generally mounted at an upward angle of about 45 degrees.

A still more simplified embodiment is shown on Figures 19, 20, and 21 wherein rod 71 is rigid with support 71A on which rollers R1 and R2 are mounted. To facilitate the displacement of the rollers, a strip of friction-diminishing means such as metal, Bakelite, glass, etc., may be mounted on the passageway of the rollers during their displacement. Such friction-diminishing means may also be made of a bent metal or stamped out from any plastic 72, Figures 19, 20, and 21, and be also provided with small guide-means in the form of an extending edge 73, to guide rollers 70 so that the device D may not displace itself either to the right or to the left in respect to its longitudinal axis. Means 72 may also be provided for an arrangement of some other kind. It is however, advisable, that the area in which the heel contacts the floor be provided with friction-augmenting means such as leather, rubber, suitable textile, or even metal if not very smooth. This area may be in the same plane as the beforementioned friction-diminishing means, or slightly above or below, as shown on Figures 16, 29 and 34.

Rods 65 or 71 may be mounted not only on one side, as illustrated on Figure 16, but on both sides of the support 64, or the support itself may form the two rods, as shown on Figures 19, 20 and 21.

Instead of rods 65 or 71, each rod, or a pair of rods, may consist of a two-part rod, 73 and 74, pivotally connected by means of 75. Rod 74 may also be pivotally connected by means 76 to the frame 67 of the rollers. Support 64 may be mounted on one or more rollers 70A and 70B, or on a pair of them.

The caterpillar connection 77 may be mounted in one row as shown on Figure 26, or in a double row, as shown on Figure 27.

Friction-diminishing means 79 may consist of two small, smooth-surfaced strips 79A and 79B as shown on Figure 27, with friction-augmenting means 81 mounted between them to increase the friction between the heel (or the sole) and the floor.

Still another embodiment is illustrated on Figures 30 to 33 wherein a flexible support in one unit 82 replaces the support 64 and the rod or rods 65 of Figures 15 and 20. This flexible support 82 may be manufactured from a flexible sheet metal or flexible plastic, such as Celluloid, rubber-containing textiles, leather, impregnated with Celluloid materials, etc.

To assist the operation of support 82, a roller 83 or suitable guide-means affixed to guide-member 84 may be provided, as shown on Figure 30, rigid in respect to the floor. The floor may be provided with a device composed of 79A, 79B, and 81, depicted on Figure 27.

For this purpose, these friction-diminishing and friction-augmenting means must be so mounted that part 81 is slightly below or somewhat above 79A, and 79B as shown on Figure 27, in order to permit the sides of support 84 to slide with greater friction between the heel and part 81. This is shown on Figure 34 wherein the friction-diminishing means have a downward bent part 84 on the upper side of which part is affixed friction-augmenting means 81. If desired, part 84 may itself have a rough surface to provide the friction-augmenting means.

The embodiment as shown on Figures 24 to 29 inclusive, shows the connection previously described as rod 65 or support 64 or rods 73 and 74, replaced by a plurality of small levers 77, aforementioned, pivotally interconnected between themselves, the pivotal displacement of which, if desired, may be limited as illustrated on Figure 25, wherein the lever 77 can only move limitedly in respect to 77A and 77B, and so on. Instead of lever, caterpillar chains or bicycle chain may be employed. One part of the caterpillar chain is pivotally or rigidly affixed to support 67 provided with rollers. The other part of the caterpillar chain may be provided with a support 78 on which the shoe rests so arranged preferably that the heel of the shoe rests on the floor, shown on Figures 24 and 25, and the sole of the shoe but lightly touches support 78. Practically the whole weight of the foot is thus transmitted through the heel of the shoe to the floor whereby a friction engagement is created sufficient to maintain the device D in its required operative position, without pressure. The driver is accordingly caused no exertion and consequently experiences little or no hardship in maintaining the throttle in the required position. To permit a more ready displacement of the caterpillar chain 77 shown in exaggerated dimension, on Figure 26, a friction-diminishing band of metal or plastic 79 may be provided below the caterpillar chain 77, or if deemed more expedient, above it, as depicted in 80 on Figures 27, 28 and 29.

If desired, roller 83 may be affixed at the end of 84 and another roller 85 provided below support 82 as shown on Figure 31. Also, lever 82 may be provided with friction-augmenting means 86 on its upper side, and rollers 87 and 88 may both be affixed by their own respective supports to the floor, or to the friction-diminishing and friction-augmenting devices 76A, 79B, 81 as shown on Figures 32 and 33.

All the parts composing the various embodiments of this device, described herein, may be manufactured from metal, or wood, or any variety of plastic, specifically such plastics, as Bakelite, monsanto plastics, etc.

Having now particularly described and ascertained the nature of my said invention and in what manner the same is to be performed, I declare that what I claim is:

1. In combination with the accelerator pedal of a vehicle, a first guide-means rigidly affixed in respect to the floor and having at least one runway provided aside of the longitudinal symmetry axis of said pedal, a second guide-means being rigidly affixed with respect to the said pedal and having at least one track aside of the longitudinal symmetry axis of said pedal, said runway and said track being operatively interconnected with each other through the intermediary of a third means, said third means being able to operatively interconnect the said track and said runway during its displacement along said accelerator pedal and a pusher-member attached to the said third means, whereby when said pusher-member is pushed to and fro, said accelerator pedal is actuated.

2. A device to be used in combination with an accelerator pedal comprising one guide-means having a long, extending guide-edge rigidly affixed to the said pedal, another guide-means having another extending guide-edge rigidly affixed to the floor, said guide-edges forming an angle in a vertical plane and being parallel in their projections on a horizontal plane, a third guide-means rigidly affixed to the floor on which third guide-means, a pusher-member, is freely displaceable to and fro, through the intermediary of rollers, said pusher-member provided on one side with at least two rollers operatively engaging the said first and second guide-edges from the upper side of the first guide-edge and from the underside of the second guide-edge respectively, whereby when the said pusher-member is pushed to and fro, the throttle is actuated.

3. In combination with the accelerator pedal of a vehicle, a first guide-means rigidly affixed in respect to the floor and having at least one runway provided on at least one side of the longitudinal symmetry axis of the said pedal, a second guide-means rigidly affixed in respect to the said accelerator pedal and having at least one track provided on at least one side of the longitudinal symmetry axis of the said pedal, said runway and said track being operatively interconnected with each other through the intermediary of a third means, said third means being able to operatively interconnect the said track and said runway during their displacement along the said accelerator pedal.

4. A device to be used in combination with an accelerator pedal comprising a first guide-means having a pair of long extending guide-edges rigidly affixed to said pedal, a second guide-means having a pair of long extending guide-edges rigidly affixed to the floor, said pairs of guide-edges of said first and second guide-means forming an angle in a vertical plane and being parallel in their projections on a horizontal plane, a third guide-means rigidly affixed to the floor on which said third guide-means, a pusher-member, is freely displaceable to and fro preferably through the intermediary of rollers, said pusher-member being provided on each of its both sides with at least two rollers operatively engaging the said pairs of guide-edges of said first and second guide-means from the upper side of said pair of guide-edges of said first guide-means and from the underside of said pair of guide-edges of said second guide-means respectively, whereby when said pusher-member is pushed to and fro, the throttle is actuated.

5. A device as set forth in claim 1 wherein a fourth guide-means rigid in respect to the floor is provided and has an extending flange on which at least one roller especially provided therefor mounted on said third means rolls, contacting the upper surface of the said flange.

6. A device as set forth in claim 2 wherein to the said pusher-member is rigidly attached a shoe-support provided therefor.

7. A device as set forth in claim 2 wherein to the said pusher-member is pivotally attached a shoe-support.

8. A device as set forh in claim 2 wherein friction-augmenting means are provided on the displacement area of the heel of the shoe resting on the said pusher member.

9. A device as set forth in claim 2 wherein friction-diminishing means are provided on the displacement area of said pusher-member and friction-augmenting means are provided on the displacement area of the heel of the shoe resting on the said pusher-member.

GEORGE A. RUBISSOW.